United States Patent
Balaji Sg et al.

(10) Patent No.: US 11,845,391 B2
(45) Date of Patent: Dec. 19, 2023

(54) EMERGENCY ESCAPE SYSTEM AND EMERGENCY ESCAPE METHOD FOR VEHICLE

(71) Applicants: Hyundai Motor Company, Seoul (KR); Kia Corporation, Seoul (KR)

(72) Inventors: Vignesh Balaji Sg, Chennai (IN); Raman Shyam, Chennai (IN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 411 days.

(21) Appl. No.: 17/322,400

(22) Filed: May 17, 2021

(65) Prior Publication Data

US 2022/0314915 A1 Oct. 6, 2022

(30) Foreign Application Priority Data

Mar. 30, 2021 (IN) .............................. 202111014426

(51) Int. Cl.
*B60R 21/017* (2006.01)
*B60J 7/057* (2006.01)
*B60J 7/043* (2006.01)
*B60R 21/01* (2006.01)
*B60R 21/00* (2006.01)

(52) U.S. Cl.
CPC ............. *B60R 21/017* (2013.01); *B60J 7/043* (2013.01); *B60J 7/0573* (2013.01); *B60R 2021/0016* (2013.01); *B60R 2021/01006* (2013.01); *B60R 2021/01252* (2013.01)

(58) Field of Classification Search
CPC .......... B60J 7/057; B60J 7/0573; B60J 7/047; B60R 21/017; B60R 21/01; B60R 2001/0016; B60Y 2400/306
See application file for complete search history.

(56) References Cited

U.S. PATENT DOCUMENTS 10,150,439 B1 * 12/2018 Hsieh .................. B60R 21/0136

FOREIGN PATENT DOCUMENTS

| JP | H11286213 A | * | 10/1999 |
| KR | 19980044499 A | * | 9/1998 |

* cited by examiner

*Primary Examiner* — Dennis H Pedder
(74) *Attorney, Agent, or Firm* — Fox Rothschild LLP

(57) ABSTRACT

An emergency escape system and an emergency escape method for a vehicle are provided. The emergency escape system includes a sunroof that is mounted at a headliner of the vehicle and a driving device opening or closing the sunroof by receiving current. A float sensor detects whether the vehicle is filled with water up to a predetermined mounting position. A pressure sensor detects a force applied to the headliner or the sunroof. A controller supplies the current to the driving device in response to receiving from the float sensor a signal indicating that the vehicle is filled with the water up to the predetermined mounting position and determining that the force applied to the headliner or the sunroof, which is detected by the pressure sensor, is greater than a predetermined force.

11 Claims, 4 Drawing Sheets

EMERGENCY ESCAPE SYSTEM AND EMERGENCY ESCAPE METHOD FOR VEHICLE

CROSS-REFERENCE TO RELATED APPLICATION

This application claims priority to and the benefit of Indian Pat. Application No. 202111014426 filed in the Indian Patent Office on Mar. 30, 2021, the entire contents of which are incorporated herein by reference.

BACKGROUND

(a) Field of the Disclosure

The present disclosure relates to an emergency escape system and an emergency escape method for a vehicle, and more particularly, to an emergency escape system and an emergency escape method for a vehicle that allows occupants in the vehicle to safely escape from the vehicle when the vehicle floods.

(b) Description of the Related Art

Vehicles are equipped with a plurality of doors for occupants to enter and exit the vehicle, and a plurality of windows for securing visibility of a driver or occupants. Some of the plurality of doors and the plurality of windows are automatically opened or closed by current supplied thereto.

However, when the vehicle floods with water, the occupants are unable to escape through the doors or the windows of the vehicle. For example, when the vehicle floods, the occupants may not be able to open the door due to external water pressure applied to the door. In addition, the window of the vehicle is made of tempered glass of a special material to protect the occupant from foreign material that collides with the vehicle while driving. Thus, the occupant may be unable to break the window without special tools. Furthermore, when the vehicle floods, a battery capable of supplying current to the doors or the windows and an engine capable of producing power are disabled. Therefore, the doors or the plurality windows are unable to be opened automatically. Accordingly, there is a need for a technology that allows the occupants in the vehicle to safely escape from the vehicle when the vehicle floods.

The above information disclosed in this section is merely for enhancement of understanding of the background of the disclosure, and therefore it may contain information that does not form the prior art that is already known in this country to a person of ordinary skill in the art.

SUMMARY

The present disclosure provides an emergency escape system and an emergency escape method for a vehicle having advantages of allowing occupants in the vehicle to safely escape from the vehicle when the vehicle floods.

An emergency escape system for a vehicle according to an exemplary embodiment of the present disclosure may include: a sunroof mounted at a headliner of the vehicle; a driving device opening or closing the sunroof by receiving current; a float sensor configured to detect whether the vehicle is filled with water up to a predetermined mounting position; a pressure sensor configured to detect a force applied to the headliner or the sunroof and a controller configured to supply the current to the driving device in response to receiving from the float sensor a signal indicating that the vehicle is filled with the water up to the predetermined mounting position and determining that the force applied to the headliner or the sunroof, which is detected by the pressure sensor, is greater than a predetermined force.

The emergency escape system may further include a battery and an auxiliary battery, each being configured to supply the current to the driving device, wherein the controller may be configured to operate the auxiliary battery to supply the current to the driving device in response to receiving from the float sensor the signal indicating that the vehicle is filled with the water up to the predetermined mounting position and determining that the force applied to the headliner or the sunroof, which is detected by the pressure sensor, is greater than the predetermined force.

The auxiliary battery may be mounted at the headliner of the vehicle. The pressure sensor may be mounted at the headliner or the sunroof. The float sensor may be mounted in a trunk or at a trunk door of the vehicle. The controller may be mounted at the headliner of the vehicle.

An emergency escape method for a vehicle according to another exemplary embodiment of the present disclosure may include: detecting, by a float sensor, whether the vehicle is filled with water up to a predetermined mounting position; detecting, by a pressure sensor, a force applied to a headliner of the vehicle or a sunroof mounted at the headliner; and supplying, by a controller, current to a driving device operating the sunroof in response to determining that the vehicle is filled with the water up to the predetermined mounting position and determining that the force applied to the headliner or the sunroof is greater than a predetermined force.

The controller may be configured to operate an auxiliary battery mounted at the headliner to supply the current to the driving device in the supplying the current to the driving device operating the sunroof. The emergency escape method may further include disconnecting, by the controller, the auxiliary battery from the driving device in response to determining that the vehicle is not filled with the water up to the predetermined mounting position or determining that the force applied to the headliner or the sunroof is less than or equal to the predetermined force. The controller may be mounted at the headliner. The pressure sensor may be mounted at the headliner or the sunroof, and the float sensor may be mounted in a trunk or at a trunk door.

According to an exemplary embodiment of the present disclosure, the occupants in the vehicle may safely escape from the vehicle by automatically opening a sunroof in response to determining, by a float sensor, that the vehicle floods and determining, a pressure sensor, the will of the occupants to escape from the vehicle. In addition, a person outside the vehicle may also open the sunroof in response to determining that the vehicle floods, to allow the outside person to rescue the occupants trapped in the vehicle.

In addition, since an auxiliary battery that supplies current to a device operating the sunroof when the vehicle floods is provided in a headliner of the vehicle, the sunroof may be operated until the vehicle is completely submerged in water. Therefore, a time margin where occupants may operate an emergency escape system is provided. In addition, other effects of the exemplary embodiments of the present disclosure should be explicitly or implicitly described in the description provided herein. Various effects predicted according to the exemplary embodiments of the present disclosure will be disclosed in the description provided herein.

BRIEF DESCRIPTION OF THE DRAWINGS

The exemplary embodiments herein may be better understood by referring to the following description in conjunction with the accompanying drawings in which like reference numerals indicate identically or functionally similar elements, of which.

Figure 1:
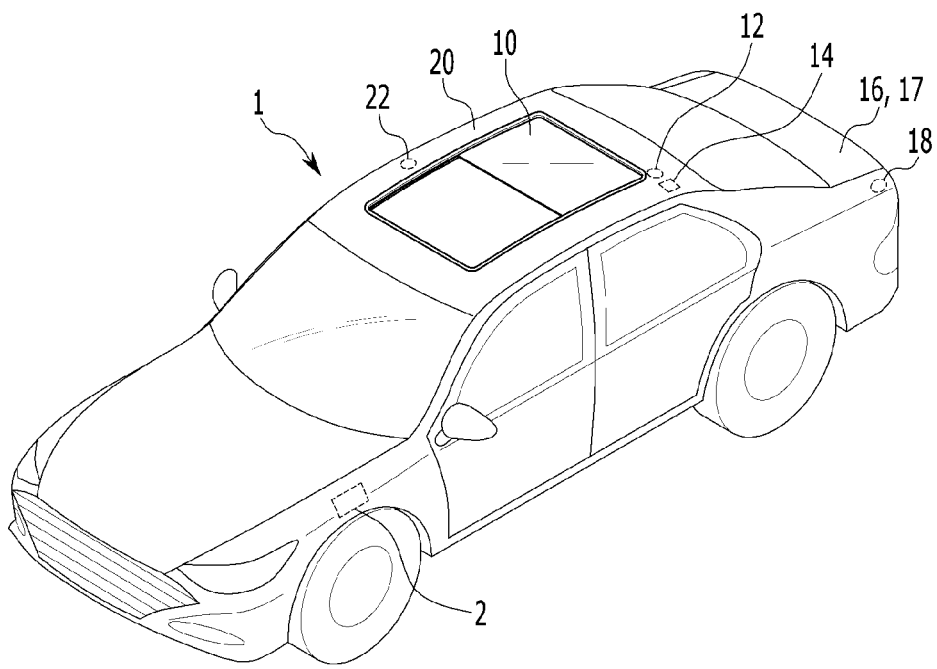
FIG. 1 is a schematic diagram showing a vehicle equipped with an emergency escape system for a vehicle according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles, in general, such as passenger automobiles including sports utility vehicles (SUVs), buses, trucks, various commercial vehicles, watercraft including a variety of boats and ships, aircraft, and the like.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 is a schematic diagram showing a vehicle equipped with an emergency escape system for a vehicle according to an exemplary embodiment of the present disclosure. As shown in FIG. 1, an emergency escape system according to an exemplary embodiment of the present disclosure may be used in a vehicle 1 equipped with a sunroof 10. The vehicle 1, which is not limited thereto, is provided with an engine compartment at a front portion thereof, and the engine and a battery 2 are mounted in the engine compartment. The battery 2 is configured to supply current to various electric devices of the vehicle 1, for example driving devices that operate windows, a starting motor, lighting devices, and on the like. Particularly, the battery 2 is configured to supply the current to a driving device 12 that operates the sunroof 10.

The vehicle 1 is provided with a cabin at a middle portion thereof and a trunk 17 at a rear portion thereof. The cabin may be opened or closed by a plurality of doors of the vehicle 1 and the trunk 17 may be opened or closed by a trunk door 16. A float sensor 18 is mounted in the trunk 17 or at a trunk door 16. The float sensor 18 will hereinafter be described in detail. A headliner 20 is mounted at an upper surface of the vehicle 1 and the sunroof 10 is mounted at the headliner 20. The sunroof 10 may be opened or closed by the driving device 12. The driving device 12 is electrically connected to the battery 2 to receive the current therefrom.

An auxiliary battery 14 and a pressure sensor 22 are mounted at the headliner 20. The auxiliary battery 14 is electrically connected to the driving device 12 to supply the current to the driving device 12. The pressure sensor 22 is configured to detect a force applied to the headliner 20 or the sunroof 10. The vehicle 1 further includes a controller 30 configured to execute an operation of the vehicle 1. The controller 30 may include various controllers, for example a controller configured to operate the engine, a controller configured to operate the battery 2 and the auxiliary battery 14, and the like, and the various controllers may be integrated into one controller 30 or be disposed apart from each other and data communication with each other may be possible. In one example, the controller 30 may be mounted at the headliner 20 so that the emergency escape system according to the exemplary embodiment of the present disclosure operates stably even when at least a part of the vehicle 1 floods. However, a mounting position of the controller 30 is not limited to the headliner 20.

Figure 2:
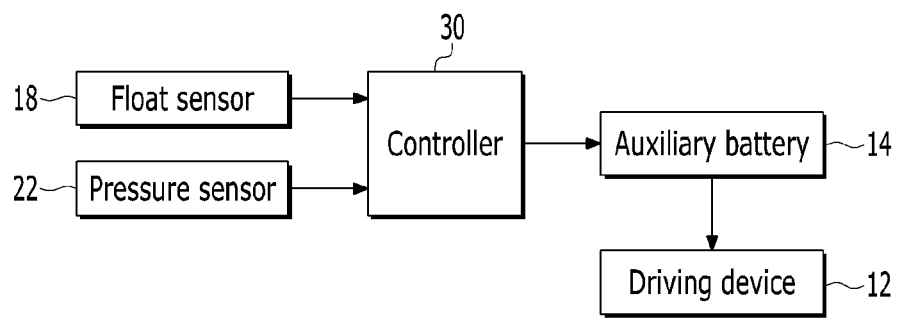
FIG. 2 is a block diagram of an emergency escape system for a vehicle according to an exemplary embodiment of the present disclosure.

FIG. 2 is a block diagram of an emergency escape system for a vehicle according to an exemplary embodiment of the present disclosure. As shown in FIG. 2, the emergency escape system for the vehicle 1 according to the exemplary embodiment of the present disclosure includes the float sensor 18, the pressure sensor 22, the controller 30, the auxiliary battery 14, and the driving device 12.

Figure 3:
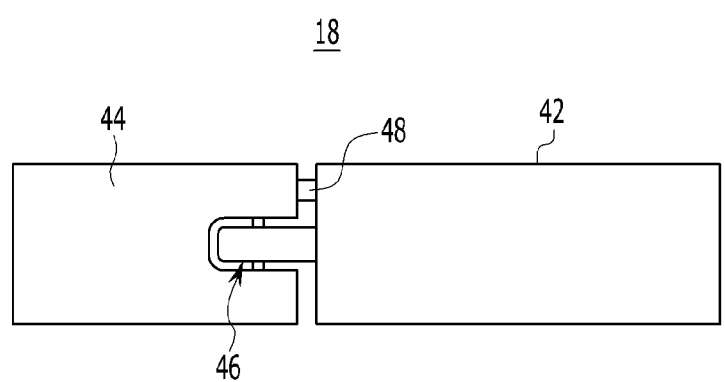
FIG. 3 is a schematic diagram of a float sensor according to an exemplary embodiment of the present disclosure.

The float sensor 18 may be mounted in the trunk 17 of the vehicle 1 or at the trunk door 16, and may be configured to detect whether the vehicle 1 floods, and transmit a signal corresponding thereto to the controller 30. In one example, as shown in FIG. 3, the float sensor 18 may include a sensor body 42, a float portion 44, a connecting portion 46, and a switch 48. The sensor body 42 is electrically connected to the controller 30 and the switch 48 is mounted at the sensor body 42. The float portion 44 is hinged to the sensor body 42 through the connecting portion 46. The float portion 44 may be made of a material that has a smaller specific gravity than water. Accordingly, if the vehicle 1 is not submerged in the water or the water level in the vehicle 1 is less than a position of the float portion 44, the float portion 44 rotates downward by gravity. At this time, the float portion 44 does not press the switch 48. If the water entering the vehicle 1 is filled to the position of the float portion 44 (i.e., if the vehicle 1 is filled with the water up to the position of the float portion 44), the float portion 44 rotates upward by buoyancy and presses the switch 48. At this time, the sensor body 42 may be configured to transmit a signal indicating that the switch 48 is pressed to the controller 30.

The float sensor 18 is not limited to a type of the float sensor 18 described herein. Any type of the float sensor 18 configured to detect that the water level in the vehicle 1 is a mounting position of the float sensor 18 may be used. On the other hand, by mounting the float sensor 18 in the trunk 17 or at the trunk door 16, frequent operation (or malfunction) of the emergency escape system may be prevented. In other words, to determine whether the vehicle 1 is actually submerged in the water, the float sensor 18 may be mounted in the trunk 17 or at the trunk door 16. However, the mounting position of the float sensor 18 is not limited to the trunk 17 or the trunk door 16. The float sensor 18 may be mounted in any position to determine whether the vehicle 1 is actually submerged in the water.

The pressure sensor 22 may be mounted at the headliner 20 or the sunroof 10, and may be configured to detect the force applied to the headliner 20 or the sunroof 10, and transmit a signal corresponding thereto to the controller 30. An occupant trapped in the flooding vehicle 1 may apply force to the sunroof 10 or the headliner 20 to escape the vehicle 1 through the sunroof 10. Additionally, a person outside the vehicle 1 may apply force to the sunroof 10 or the headliner 20 to rescue the occupants trapped in the flooding vehicle. The pressure sensor 22 may be configured to detect the force that the occupant or the person outside the vehicle 1 apply to the sunroof 10 or the headliner 20, and transmit the signal corresponding thereto to the controller 30. However, the mounting position of the pressure sensor 22 is not limited to the headliner 20 or the sunroof 10. The pressure sensor 22 may be mounted at any position to detect an escape will of the occupant or a rescue will of the person outside the vehicle 1.

The controller 30 is electrically connected to the float sensor 18 and the pressure sensor 22, and may be configured to operate the auxiliary battery 14 to supply the current to the driving device 12 in response to receiving the signal from the float sensor 18 and determining that the force detected by the pressure sensor 22 is greater than a predetermined force. In other words, the controller 30 may be configured to receive the signal from the float sensor 18 to determine that the vehicle 1 actually floods and receive from the pressure sensor 22 the signal corresponding to the force detected by the pressure sensor 22 to compare the force with the predetermined force. During the vehicle 1 travels, various forces may be applied to the pressure sensor 22. Therefore, the escape will or the rescue will may be determined by comparing the force detected by the pressure sensor 22 with the predetermined force.

In response to determining that the force is greater than the predetermined force, the controller 30 may be configured to determine that the occupant has the escape intention or the person outside the vehicle 1 has the rescue intention and establishes electrical connection between the auxiliary battery 14 and the driving device 12. As described above, if the vehicle 1 does not flood, the driving device 12 may be operated by receiving the current from the battery 2. However, if the vehicle 1 floods, the battery 2 mounted in the engine compartment or the like may be disabled. Since the auxiliary battery 14 is mounted at the headliner 20, the auxiliary battery 14 may be enabled until the vehicle 1 is completely submerged in the water. Therefore, the controller 30 may connect the auxiliary battery 14 mounted at the headliner 20 with the driving device 12, and thus, the auxiliary battery 14 may be configured to supply the current to the driving device 12. Therefore, the sunroof 10 may be automatically opened.

For this purpose, the controller 30 may include a memory configured to store program instructions, and a processor configured to execute the program instructions to perform processes of a method according to an exemplary embodiment of the present disclosure. In one example, the controller 30 may be configured to operate the auxiliary battery 14 to always supply the current to the driving device 12. In another example, the controller 30 may be configured to operate the auxiliary battery 14 to supply the current to the driving device 12 only when the auxiliary battery 14 receives a control signal from the controller 30. In this example, it may be possible to reduce a capacity of the auxiliary battery 14 and prevent frequent replacement of the auxiliary battery 14 by allowing the auxiliary battery 14 to supply the current to the driving device 12 only in emergency situations.

Figure 4:
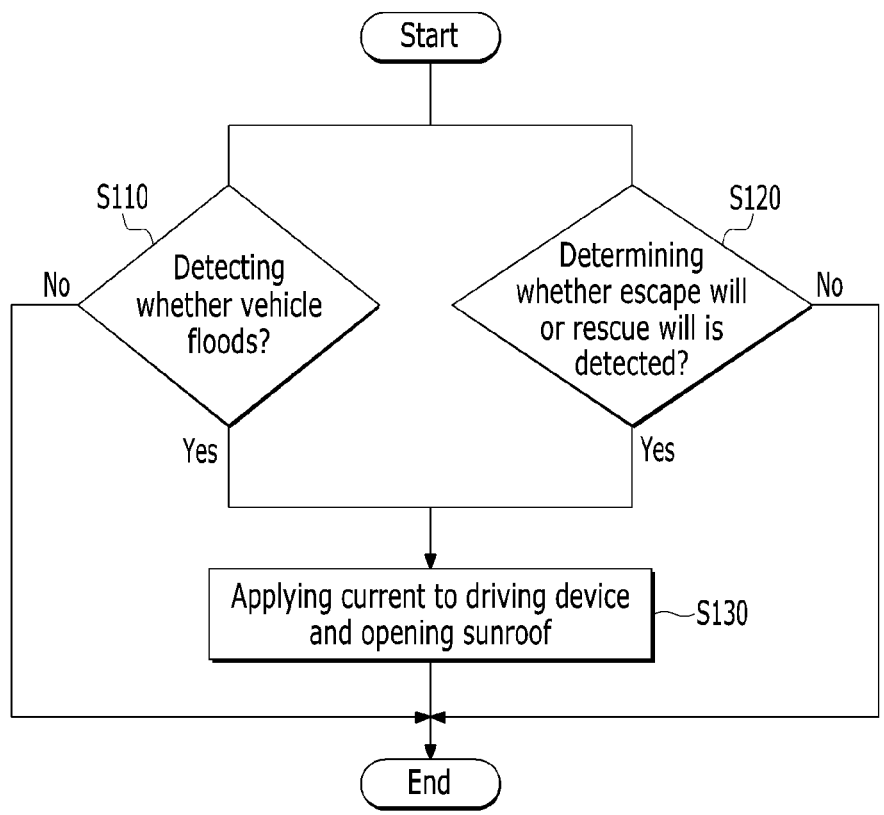
FIG. 4 is a flowchart of an emergency escape method for a vehicle according to another exemplary embodiment of the present disclosure.

FIG. 4 is a flowchart of an emergency escape method for a vehicle according to another exemplary embodiment of the present disclosure. An emergency escape method for a vehicle according to another exemplary embodiment of the present disclosure uses the emergency escape system for a vehicle according to the exemplary embodiment of the present disclosure.

When the vehicle 1 is started, the float sensor 18 may be configured to determine whether at least a part of the vehicle 1 is submerged in the water at step S110. As described above, if a position of the vehicle 1 at which the float sensor 18 is mounted is submerged in the water, the float sensor 18 may be configured to transmit the signal indicating that the at least the part of the vehicle 1 is submerged in the water to the controller 30. As described above, the float sensor 18 may be mounted at a predetermined position of the vehicle 1, and in one example, the float sensor 18 may be mounted in the trunk 17 or at the trunk door 16.

In addition, the pressure sensor 22 may be configured to detect the force applied to the headliner 20 or the sunroof 10. In response to the pressure sensor 22 detecting the force applied to the headliner 20 or the sunroof 10, the pressure sensor 22 may be configured to transmit the signal indicating the force to the controller 30. The force applied to the headliner 20 or the sunroof 10 may indicate the escape intention of the occupant or the rescue intention of the person outside the vehicle 1. The controller 30 may be configured to determine whether the force applied to the headliner 20 or the sunroof 10 is greater than the predetermined force based on the signal received from the pressure sensor 22. In other words, the controller 30 may be configured to determine whether the occupant has the escape intention or the person outside the vehicle 1 has the rescue intention at step S120. The controller 30 may be configured to determine that the occupant has the escape intention or the person outside the vehicle 1 has the rescue intention if the force detected by the pressure sensor 22 is greater than the predetermined force.

In response to determining that the at least the part of the vehicle 1 is submerged in the water and that the occupant has the escape intention or the person outside the vehicle 1 has the rescue intention, the controller 30 may be configured to supply an electric power to the driving device 12 to automatically open the sunroof 10 at step S130. As described above, the controller 30 connects the auxiliary battery 14 mounted at the headliner 20 of the vehicle 1 to the driving device 12 such that the auxiliary battery 14 supplies the current to the driving device 12. Accordingly, the driving device 12 may be configured to open the sunroof 10, and the occupant in the vehicle 1 may escape from the vehicle 1 through the opened sunroof 10. In addition, the person outside the vehicle 1 may rescue the occupant or help the occupant escape from the vehicle 1 through the opened sunroof 10.

In response to determining that the vehicle 1 is not flooding with water or the escape intention of the occupant or the rescue intention of the person outside the vehicle 1 is not detected, the controller 30 may be configured to complete the emergency escape method for the vehicle 1 according to another exemplary embodiment of the present disclosure. At this time, the controller 30, if the auxiliary battery 14 is connected to the driving device 12, may disconnect the auxiliary battery 14 from the driving device 12 and connect the battery 2 to the driving device 12.

While this disclosure has been described in connection with what is presently considered to be practical exemplary embodiments, it is to be understood that the disclosure is not limited to the disclosed exemplary embodiments. On the contrary, it is intended to cover various modifications and equivalent arrangements included within the spirit and scope of the appended claims.

DESCRIPTION OF SYMBOLS

1: vehicle
2: battery
10: sunroof
12: driving device
14: auxiliary battery
16: trunk door
17: trunk
18: float sensor
20: headliner
22: pressure sensor
30: controller
42: sensor body
44: float portion
46: connecting portion
48: switch

What is claimed is:

1. An emergency escape system for a vehicle, comprising:
a sunroof mounted at a headliner of the vehicle;
a driving device configured to open and close the sunroof by receiving a current;
a float sensor configured to detect whether the vehicle is filled with water up to a predetermined mounting position;
a pressure sensor configured to detect a force applied to the headliner or the sunroof; and
a controller configured to supply the current to the driving device in response to receiving from the float sensor a signal indicating that the vehicle is filled with the water up to the predetermined mounting position and determining that the force applied to the headliner or the sunroof, which is detected by the pressure sensor, is greater than a predetermined force.

2. The emergency escape system of claim 1, further comprising:
a battery and an auxiliary battery, each being configured to supply the current to the driving device,
wherein the controller is configured to operate the auxiliary battery to supply the current to the driving device in response to receiving from the float sensor the signal indicating that the vehicle is filled with the water up to the predetermined mounting position and determining that the force applied to the headliner or the sunroof, which is detected by the pressure sensor, is greater than the predetermined force.

3. The emergency escape system of claim 2, wherein the auxiliary battery is mounted at the headliner of the vehicle.

4. The emergency escape system of claim 1, wherein the pressure sensor is mounted at the headliner or the sunroof.

5. The emergency escape system of claim 1, wherein the float sensor is mounted in a trunk or at a trunk door of the vehicle.

6. The emergency escape system of claim 1, wherein the controller is mounted at the headliner of the vehicle.

7. An emergency escape method for a vehicle, comprising:
detecting, by a float sensor, whether the vehicle is filled with water up to a predetermined mounting position;
detecting, by a pressure sensor, a force applied to a headliner of the vehicle or a sunroof mounted at the headliner; and
supplying, by a controller, current to a driving device operating the sunroof in response to determining that the vehicle is filled with the water up to the predetermined mounting position and determining that the force applied to the headliner or the sunroof is greater than a predetermined force.

8. The emergency escape method of claim 7, wherein the controller is configured to operate an auxiliary battery mounted at the headliner to supply the current to the driving device in the supplying the current to the driving device operating the sunroof.

9. The emergency escape method of claim 8, further comprising:
disconnecting, by the controller, the auxiliary battery from the driving device in response to determining that the vehicle is not filled with the water up to the predetermined mounting position or determining that the force applied to the headliner or the sunroof is less than or equal to the predetermined force.

10. The emergency escape method of claim 7, wherein the controller is mounted at the headliner.

11. The emergency escape method of claim 7, wherein the pressure sensor is mounted at the headliner or the sunroof, and the float sensor is mounted in a trunk or at a trunk door.

* * * * *